B. F. LIDDON.
VEHICLE JACK.
APPLICATION FILED DEC. 29, 1911.
1,040,223.
Patented Oct. 1, 1912.
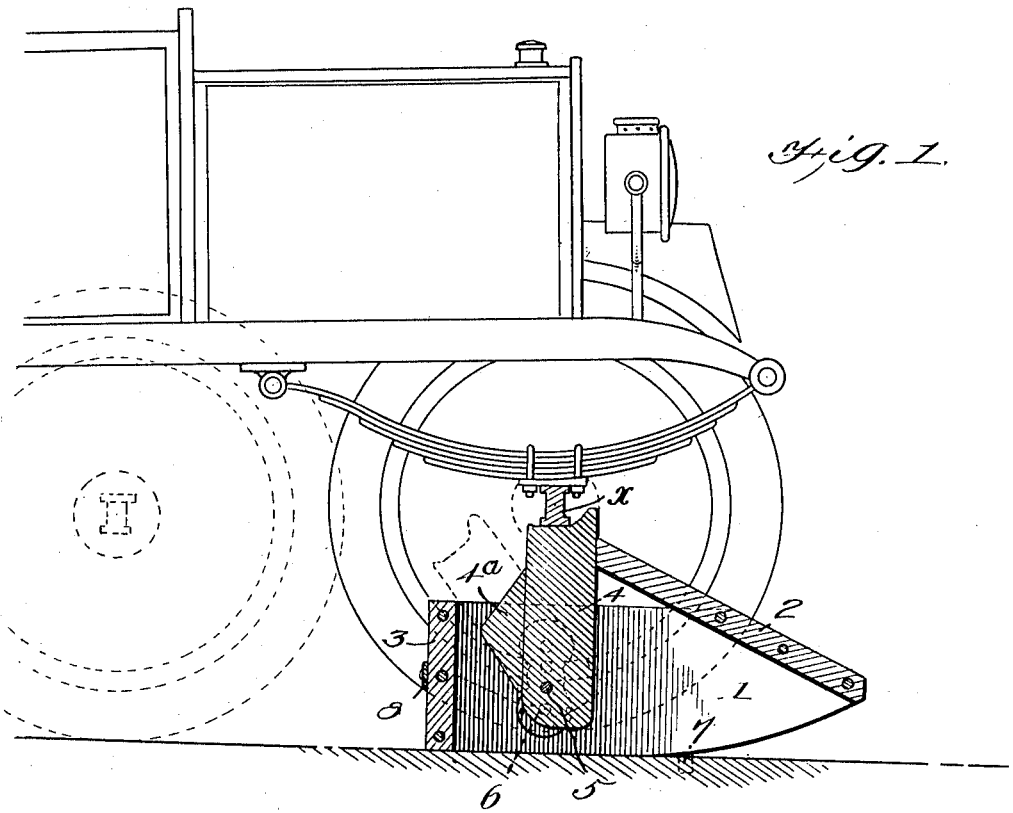
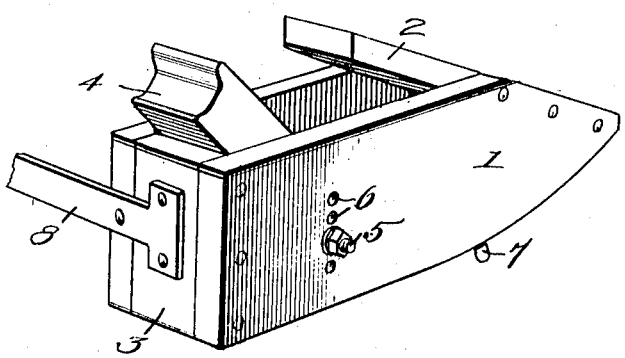
WITNESSES
INVENTOR
Benjamin F. Liddon
ATTORNEYS

UNITED STATES PATENT OFFICE.

BENJAMIN F. LIDDON, OF CORINTH, MISSISSIPPI.

VEHICLE-JACK.

1,040,223.  Specification of Letters Patent.  Patented Oct. 1, 1912.

Application filed December 29, 1911. Serial No. 668,394.

*To all whom it may concern:*

Be it known that I, BENJAMIN F. LIDDON, a citizen of the United States, and a resident of Corinth, in the county of Alcorn and State of Mississippi, have invented an Improvement in Vehicle-Jacks, of which the following is a specification.

My invention is an automatic jack for axles of automobiles and other wheeled vehicles, the same having a rocker body to which is pivoted an axle-supporting bar adapted to automatically engage an axle when a vehicle is run over the jack.

The invention is particularly adapted for convenient use in supporting automobiles, so that their pneumatic tires may be entirely relieved of pressure when in the garage.

The invention is embodied in the special construction and combination of parts hereinafter described, and illustrated in the accompanying drawing, in which—

Figure 1 is a vertical longitudinal section of my improved jack supporting an automobile axle. Fig. 2 is a perspective view of the same.

The jack is formed of two parallel side pieces indicated by numeral 1, and interposed front and rear pieces 2 and 3. All the parts are preferably constructed of wood, although other material may be used. The side pieces 1 are formed of planks or thick boards, which are spaced a few inches apart, the front and rear pieces 2 and 3 being interposed and secured by nails, screws or other suitable means. The sides 1 are constructed as rockers, the front portion being curved upward and the rear portion being straight, so that it is adapted to rest flat on a floor or other level surface.

An axle-engaging and -supporting bar 4 is pivoted between the sides 1 at a point above the bottom thereof and about midway of the rear portion. The pivot may consist of a stout rod 5 extending through the sides 1 and axle-support 4, and the same is adapted for vertical adjustment by means of holes 6 formed in the side pieces 1, as illustrated in Fig. 2. In other words, this construction adapts the bar 4 to be raised or lowered to accommodate high or low automobiles.

The front piece 2, before referred to, is inclined at an angle of about 45° and extends upward and rearward to a point where it is adapted to engage the axle-support 4 when in working position shown by full lines in Fig. 1. In other words, the part 2 serves as a stop or abutment for the bar 4, which, it will be noted, is pivoted eccentrically as regards the point of support on which the automobile axle rests. Owing to this arrangement of the pivot, it is obvious that the bar 4 bears against the stop 2 with a pressure sufficient to offset the tendency to rock backward when an automobile is supported on the bar. Yet the eccentricity of the pivot is so slight that it requires but slight pressure to push the automobile back and thus free it from the support. The rear side of the bar 4 is provided with a triangular block $4^a$ which, when the bar is thrown back to the position indicated by dotted lines in Fig. 1 and full lines in Fig. 2, engages the rear cross-piece 3.

It will be apparent that, when placed in the inclined position indicated, and an automobile is run over the jack, the axle $x$ of the auto, upon striking the recessed head of the bar 4, will be automatically raised to the position shown by full lines in Fig. 1, and that in such case the swing of the bar with the weight of the automobile applied will be arrested by the stop 2 and without serious shock or jar, since the impetus or momentum will be taken up by the adaptation of the jack to rock on its front curved portion; whereas, without this adaptation of the jack to rock forward, the shock or jar might be in many cases too violent for safety.

To prevent "creeping" or a possible forward movement of the jack on the floor or other base, I preferably provide it with a stop-pin 7, which projects from the rocker at the point adjacent to the junction of its curved and straight edges, and is adapted to project into a hole or socket in the floor. Two jacks may be used for a single vehicle axle and made entirely disconnected or independent of each other; or two jacks may be rigidly connected, so as to operate as one, by a cross bar 8 extending between and secured to their rear portions, as shown in Fig. 2.

What I claim is:—

1. In an automatic jack, the combination with a body portion formed of parallel side portions and interposed front and rear pieces, of an axle-engaging and supporting bar pivoted between the sides and adapted to swing forward and back and having a triangular piece secured to its rear side and adapted to engage the rear cross piece, substantially as described.

2. The improved automatic jack, comprising a body having its base portion constructed upon curved and straight lines to form a rocker and provided with a stop arranged adjacent to the junction of the curved and straight lines, a swinging bar pivoted to the body and adapted to engage and support an axle, and a stop rigidly secured to the body and adapted to engage the bar when swung to a vertical position, substantially as described.

BENJAMIN F. LIDDON.

Witnesses:
JAMES F. GISH,
GEORGE C. TAYLOR.